United States Patent

[11] 3,604,880

[72] Inventor Roger M. O'Neill
Oaklawn, Ill.
[21] Appl. No. 48,412
[22] Filed June 22, 1970
[23] Division of Ser. No. 655,931, July 25, 1967, Pat. No. 3,548,140
[45] Patented Sept. 14, 1971
[73] Assignee Continental Can Company, Inc.
New York, N.Y.

[54] FLUX CONCENTRATOR
2 Claims, 7 Drawing Figs.
[52] U.S. Cl. .................................................. 219/10.53,
156/69, 156/380
[51] Int. Cl. ....................................................... B23k 13/02
[50] Field of Search ............................................ 219/10.53,
10.43,; 156/272, 275, 380, 69

[56] References Cited
UNITED STATES PATENTS
2,749,423 6/1956 Bisterfeld ...................... 219/10.43

2,481,071 9/1949 Bowlus ........................ 219/10.43
2,620,425 12/1952 Seiler ........................... 219/10.53

Primary Examiner—J. V. Truhe
Assistant Examiner—Gale R. Peterson
Attorney—Diller, Brown, Ramik & Holt ABSTRACT: This disclosure relates to apparatus for inductively coupling energy into heat activated magnetic sealing material to effect the sealing of containers. Such apparatus includes a coil generally conforming to the shape of the container portion to be sealed and a flux concentrator of relatively high permeability and electrical resistivity for concentrating magnetic flux only in those areas of the container including the sealing material. The flux concentrator houses the coil and is formed with an air gap shaped to accommodate the container portion to be sealed. Further, this application discloses a method of sealing containers by coupling energy into heat activated magnetic sealing materials while limiting the heating of adjacent portions of the container and the container contents.

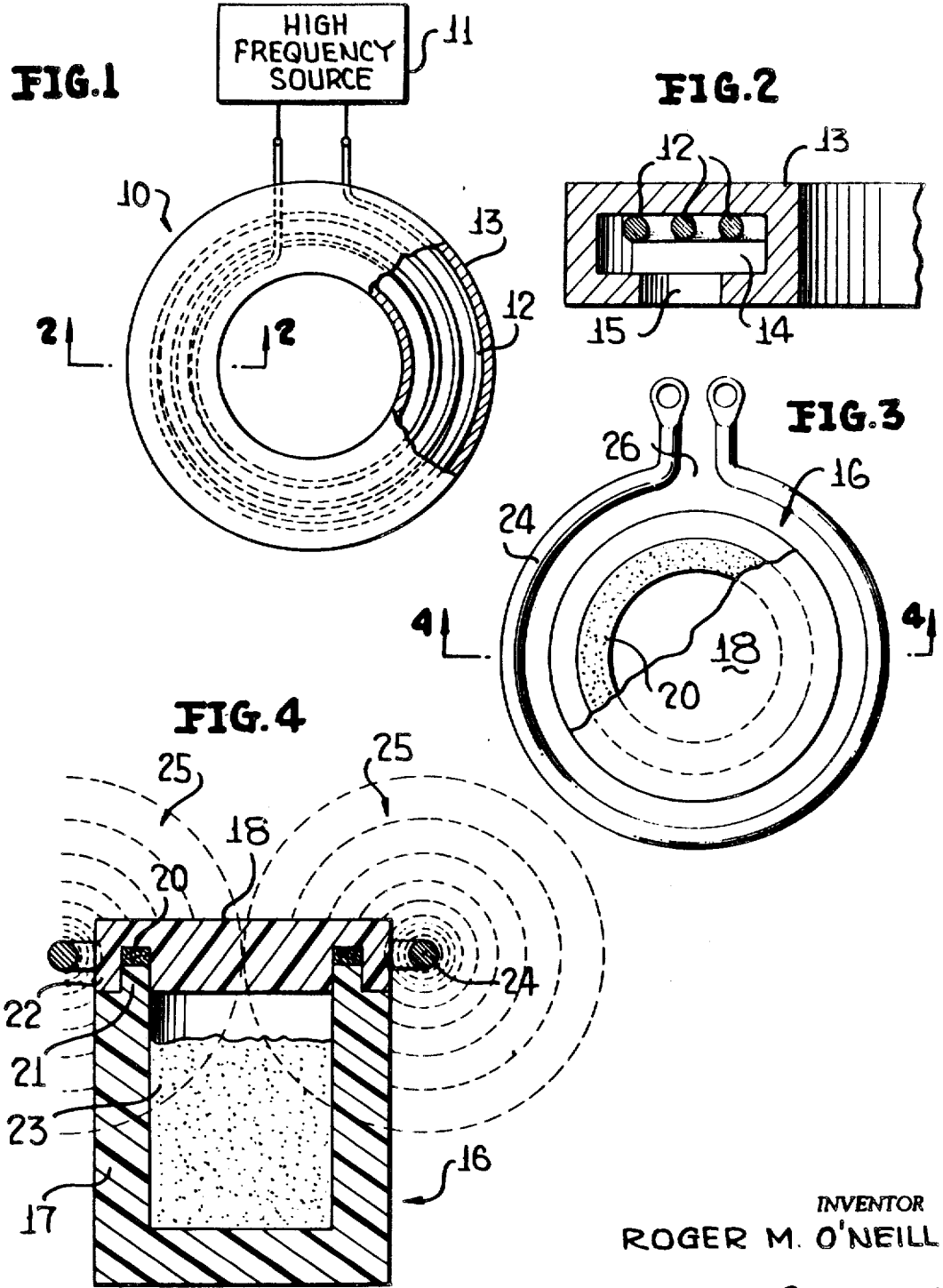

INVENTOR
ROGER M. O'NEILL

ATTORNEYS

FLUX CONCENTRATOR

This application is a division of copending application Ser. No. 655,931, filed July 25, 1967, now a U.S. Pat. No. 3,548,140 granted Dec. 15, 1970.

This invention relates generally to electricity sealing containers and more particularly to methods and apparatus for electrically sealing such containers through the use of heat-activated magnetic sealing compounds.

Sealing compounds which are responsive to the passage of magnetic flux therethrough for sealing together members of plastic, paper and the like are relatively well known to the art. An electrical conductor or coil may be placed in proximity to such compounds and energized from a relatively high frequency source to induce eddy currents and/or hysteresis losses in the magnetic compound to produce the heat required to effect the desired sealing together of members. The employment of such a sealing technique is particularly useful in the sealing of relatively thick walled containers wherein heating of the sealing compound via conduction through the walls from externally applied heating sources would be undesirable due to the resultant container distortion or the heating of the container contents.

In attempting to seal containers in accordance with the aforementioned method several problems have arisen. One such problem is the relatively low efficiency previously achieved in the coupling of energy into the heat-activated magnetic sealing compound. Such inefficiency arises from the fact that the flux produced by the high frequency energization of the actuating coil is not confined solely to the area of the sealing compound but, rather, permeates the entire area lying in the vicinity of such coil. It will, of course, be recognized that the magnetic field established in the vicinity of a conductor decreases as a function of the distance from such conductor. Thus, in accordance with the well-known relationship $B=uH$, where $B$ is the flux density at a point in the area of the conductor, $H$ is the magnetic field at that point and $u$ is the magnetic permeability of the medium in which the field is established, the flux density resultant from the energization of the conductor is greatest immediately adjacent the conductor and diminishes in accordance with the lessening of the magnetic field as the distance from the conductor increases, provided the medium in the area of the conductor is uniform, homogeneous and isotropic. Inasmuch as it is not possible to apply an external conductor directly adjacent the sealing compound when sealing together container members, a significant portion of the electrical power needed to seal such members must be provided to produce unusable high density flux concentrations in areas immediately adjacent the conductor.

Further, in establishing flux density levels sufficient to activate the sealing compound, undesirable heating of the contends of the container has resulted due to the induction of electrical energy in the area of such contends resultant from the extension of the magnetic field beyond the area of the sealing compound.

Attempts have been made to provide electrical conductors conforming to the configurations of the container portions to be sealed. However, such attempts have met with relatively little success inasmuch as it is still not possible to position the heat-activated sealing compound immediately adjacent such conductors and, further, such attempts do not decrease the amount of heating of the container contents.

The use of a relatively high current facilitating conductor which extends parallel to the container portions to be sealed together requires the spacing apart of the terminal portions of the conductor where such material portions are brought into proximity with the container. AT this point, then, it is extremely difficult to effect heating of the sealing compound.

While attempts have been made to shield the contents of the container by the employment of shields of copper of the like to redirect the flux away from the container proper and into the area of the sealing compound, such attempts have had little effect on the inefficiency of the sealing operation and have not been wholly successful in eliminating the heating of the container contends.

In accordance with the foregoing it is a primary object of this invention to provide an improved flux concentration having an air gap shaped to accommodate portions of a container to be sealed together.

Another object of this invention is to provide a flux concentrator having high electrical resistivity for substantially reducing heating thereof due to the production of eddy currents therein.

With the above and other objects in view that will hereinafter appear, the nature of the invention will be more fully understood by reference to the following detailed description, the appended claims, and the several views illustrating in the accompanying drawings.

IN THE DRAWINGS

FIG. 1 is a top plan view of an electromagnetic container sealing device, and shows a flux concentrator member in association with an electromagnetic coil which is to be energized from a suitable high frequency source.

FIG. 2 is an enlarged fragmentary sectional view taken along the line 2—2 of FIG. 1, and shows an airgap and channel formed in the flux concentrator with the electromagnetic coil located in such channel.

FIG. 3 is a top plan view showing a container in association with an electromagnetic coil, absent the provisions of this invention.

FIG. 4 is an enlarged sectional view taken along the line 4—4 of FIG. 3, and shows a graphic representation of the flux distribution resultant from the energization of the electromagnetic coil.

Figure 5:
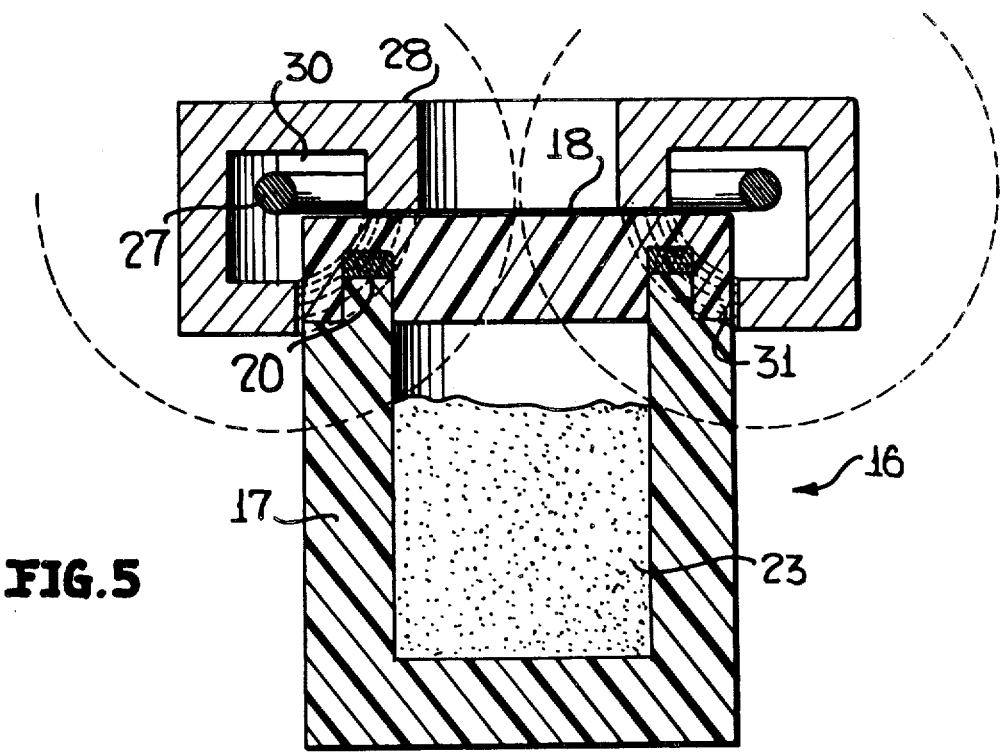
FIG. 5 is a sectional view of a container and closure member in association wit an electromagnetic coil and flux concentrator, and graphically illustrates the flux density distribution resultant from the utilization of this invention.

Referring now to the drawings in detail, indicated generally at 10 is an electromagnetic container sealing device suitable for sealing together container portions having interposed therebetween heat activated magnetic sealing compounds. An energizing source 11, suitable for the production of relatively high frequency voltages is connected to an electromagnetic coil 12 which is housed within a flux concentrator member 13. A channel 14, best seen in FIG. 2, extends through the flux concentrator 13 and houses the one or more conductors of the electromagnetic coil 12. An air gap 15 extends along the length of the flux concentrator 13 and is dimensioned to accept portions of a container which are to be sealed together through the utilization of heat activated magnetic sealing compounds.

Upon the energization of the coil 12, a flux path will be established in the flux concentrator 13 and will extend across the airgap 15. Quantities of heat activated magnetic sealing compounds located in the airgap 15 will be subjected to a relatively high flux concentration inasmuch as such compounds will lie directly in the flux path established by the flux concentrator 13.

The benefits attributable to the utilization of a flux concentrator similar to member 13 will be appreciated through a consideration of FIGS. 3 and 4. In FIG. 3 a container, generally indicated by the numeral 16 includes a container body portion 17 and a cooperating container closure member 18. A quantity of heat activated magnetic sealing compound 20 is shown disposed intermediate the closure member 18 and the body member 17 and such sealing compound is located in a channel defined by interfitting container body member portion 21 and a downwardly extending container closure member portion 21. The container 16 encloses a quantity of fill 23 which is any substance of the numerous substances which one may desire to package.

Located adjacent the container closure member 18 is an electromagnetic coil suitable for energization from an electromagnetic coil suitable for energization from an electrical power source such as the source 11 shown in FIG. 1.

Upon energization of the coil 24, a flux distribution will be established in the areas adjacent the coil 24 for activation of the sealing compound 20. The flux distribution resultant from utilization of the coil 24 will substantially conform to the numeral 25 in FIG. 4. It will be noted that the flux density in the area of the electromagnetic coil 24 is greatest immediately adjacent such coil and diminishes as the distance from the coil is increased. The flux density distribution as illustrated in FIG. 3 results from the lessening of the magnetic field established by the coil 24 as a function of the distance from such coil. The flux density being determined by the relationship $B=uH$ as described hereinbefore. The space surrounding the electromagnetic coil 24, including the container body member 17 and the container closure member 18, is substantially uniform, homogeneous and isotropic. The flux density in the area of the sealing compound 20 is of an intermediate level, being substantially less than the flux density immediately adjacent the coil 24 and somewhat higher than the flux density at points in space more greatly removed from the cool. Thus, in assuring that the flux density in the area of the sealing compound 20 is capable of activating the compound to seal together the portions of the container immediately adjacent the compound, it is necessary to substantially increase the flux density beyond the area of the compound. The increasing of flux density in areas located farther from the coil 24 is undesirable inasmuch as heating or "cooking" of the fill may result and the production of nonutilizable flux represents an inefficient utilization of the electrical power necessary to establish the desired flux pattern.

Furthermore, the utilization of an electromagnetic coil similar to the coil 24 makes difficult the sealing together of container portions adjacent the point where the ends of the coil are brought into proximity with and away from the container. As is best seen in FIG. 3, a space 26 must be provided intermediate the ends of the coil 24 to assure the prevention of arcing in that area. The necessity of spacing apart of the ends of the coil in the area 26 results in a serious decrease in flux density in that area and, commonly, the heat activated magnetic sealing compound adjacent the space 26 is not sufficiently activated to assure the total sealing together of the container body member 17 and the container closure member 18. Thus, where hermetic sealing is required, the employment of a coil similar to the coil 24 decreases the reliability with which hermetic sealing can be effected.

FIG. 5 shows the container 16, container body portion 17, container closure member 18, and the quantity of heat activated magnetic sealing compound 20 located in cooperation with an electromagnetic coil 27 and a flux concentrator 28. The flux concentrator 28 includes a coil housing channel 30 formed therethrough and an air gap 31 into which is inserted the quantity of sealing compound 20 and the container portion enclosing such quantity of compound therebetween.

The flux concentrator 28 is formed of high permeability material such that the space surrounding the electromagnetic coil 27 cannot be said to e uniform, homogeneous and isotropic.

Through the utilization of a high permeability flux concentrator such as the flux concentrator 28, the flux pattern established by the coil 27 will be concentrated in the flux path defined by the flux concentrator 28 and the airgap 31 formed in such flux concentrator. By properly diminishing the airgap 31, substantially all of the flux produced through the energization of the coil 27 may be directed into the immediate area of the sealing compound 20. While a certain small proportion of the flux lines do extend outwardly beyond the area of the flux gap as a result of "fringing," such extension of "fringing" is determined by the length of the gap itself and may be held to a minimum through proper dimensioning of the airgap 31. It should, of course, be immediately apparent that the utilization of a flux concentrator such as the flux concentrator 28 greatly reduces the flux density in areas of the container wherein such concentration is undesired. The concentration of flux in the immediate area of the sealing compound 20 greatly improves the efficiency of the electromagnetic sealing device while reducing substantially the heating of the adjacent portions of the container and the heating of the fill 23 to greatly reduce the possibility of container deformation and "cooking" of the fill. The increase in efficiency resultant from the use of the concentrator 28 results from the fact that it is no longer necessary to produce a substantial flux density at points in space locating farther from the electromagnetic coil 27 than the sealing compound 20. Thus, substantially all the flux produced is utilized.

In activating heat activated magnetic sealing compounds, eddy currents and/or hysteresis losses are utilized to produce the necessary heating of such compounds. Thus, it is highly desirable to use a relatively high frequency generator or source to energize the electromagnetic coil inasmuch as both eddy currents and hysteresis heating are functions of the time rate of change of the flux density producing such eddy currents and hysteresis losses. Increasing the permeability of the flux concentrators improves the resultant heating of the sealing compound. Thus, the flux concentrator should be of a magnetic permeability which is much higher than the surrounding medium. That is, the permeability of the concentrator should be very high with respect to the atmosphere in which the container is to be sealed and the material of the container itself. Such high permeability is afforded through the use of ferromagnetic or ferromagnetic materials such as, for example, iron, nickel, cobalt, alloys of those metals and iron oxide (magnetite) and ferrite. Suitable results may be achieved through choosing an energization frequency of from 10 kilohertz to 100 megahertz.

Inasmuch as relatively high frequencies are utilized in the energization of the electromagnetic coils, substantial heating of the magnetic flux concentrator itself is to be expected. Heating of the flux concentrator may be greatly reduced through the reduction of eddy current losses within such concentrator. Thus, the formation of the flux concentrator from materials of high resistivity such as magnetite and ferrite is desirable. The mechanical and thermal characteristics of magnetite cause that material to be preferable where energization frequencies of below approximately 1 megahertz are contemplated. However, at frequencies higher than approximately 1 megaHertz, high frequency ferrites are desirable because of their higher permeability and greater resistance to eddy current losses.

While the relative high electrical resistivity of magnetite and ferrite greatly reduces hearing of the magnetic flux concentrators, hysteresis losses may produce undesirably high temperatures within the concentrators and, thus, special cooling procedures to limit the temperatures of the flux concentrators may be required. For example, a flow of coolant may be directed through or over a flux concentrator is undesirably high temperatures are encountered in the employment of such a concentrator.

Figure 6:
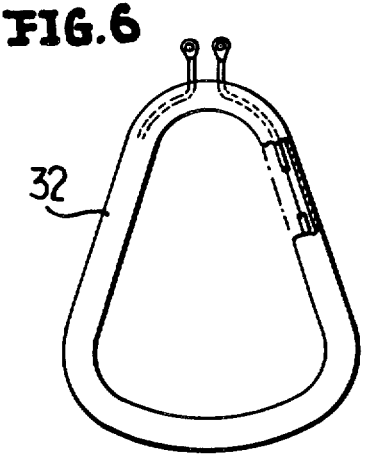
FIG. 6 is a top plan view of a further embodiment, and shows an electromagnetic container sealing device which is especially constructed to conform to particularly shaped containers.
Figure 7:
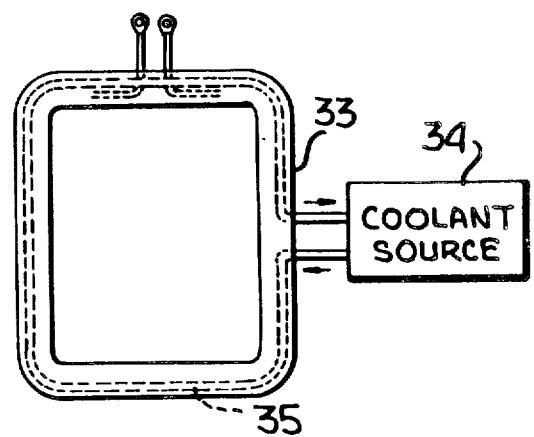
FIG. 7 is a top plan view of a further embodiment, and shows an electromagnetic container sealing device including cooling provisions associated therewith.

FIGS. 6 and 7 illustrate two further flux concentrator configurations, each adapted to be used with particular container configurations. The flux concentrator 32 is particularly formed for application to a container configuration commonly encountered in the packaging of hams and the like. The flux concentrator 33 is suitably adapted for the sealing of containers being of a rectangular configuration. It is to be noted that containers of any of a number of configurations may be conveniently sealed through the utilization of flux concentrators formed in accordance with this invention. When the container closure is to be sealed to a container body member completely about the periphery of the container closure, it is desirable to use a flux concentrator whose high permeability member forms a complete closed and continuous loop. The utilization of a closed and continuous loop assures the activation of the hat activated magnetic sealing compound about the total periphery of the container closure member and, thus, assures hermetic and leakproof sealing of the container.

The flux concentrator 33 is illustrated as having formed therein a coolant passage 35 suitable for the passage of coolant therethrough. The coolant passage 35 is connected into a schematically illustrated coolant source 34, capable of providing sufficient coolant flow to maintain the temperature of the concentrator 33 at an acceptable level.

While the structures shown and described above represent preferred forms of the invention, it will be readily apparent to one of ordinary skill in the art that many variations may be effected in such structures, including the formation of flux concentrators in conformance with particular container geometry, without departure from the scope and spirit of the invention as defined in the appended claims.

I claim:

1. A flux concentrator for use in the concentration of flux in portions of a container to be sealed together by the heating of heat-activated magnetic sealing compounds, said concentrator comprising a continuous closed loop of magnetic material of high permeability, channel means formed in said loop for housing a conductive coil, said channel means extending lengthwise through said loop, an airgap formed along said loop for receiving portions to be sealed together and for concentrating flux in the area defined by and adjacent to said gap.

2. A flux concentrator according to claim 1 wherein said loop is formed of material of high resistivity.